United States Patent [19]

Furgeson et al.

[11] Patent Number: 5,426,418
[45] Date of Patent: Jun. 20, 1995

[54] BRAKE LIGHT CONFIGURATION FOR A TRUCK HAVING AN ENGINE BRAKE

[76] Inventors: Robert G. Furgeson, Box 2430 High Prairie, Alberta, Canada, T0G 1E0; Ray C. Furgeson, 9639-77 Avenue, Grande Prairie, Alberta, T8V 4L5, Canada

[21] Appl. No.: 257,913

[22] Filed: Jun. 10, 1994

[51] Int. Cl.⁶ .............................................. B60Q 1/44
[52] U.S. Cl. .................................. 340/479; 340/467; 340/468; 307/10.8
[58] Field of Search ............. 340/479, 463, 467, 464, 340/466, 468; 307/10.8; 200/61.89

[56] References Cited

U.S. PATENT DOCUMENTS 4,757,301 7/1988 Neale, Jr. ............................ 340/479
4,823,109 4/1989 Boyer .................................. 340/467
5,210,522 5/1993 Hockman et al. ................... 340/467

*Primary Examiner*—Jeffery A. Hofsass
*Attorney, Agent, or Firm*—Anthony R. Lambert

[57] ABSTRACT

A brake light configuration for a truck having an engine brake is described which includes the engine brake, a pedal activated brake, a power source and brake lights. A first circuit connects the power source and the pedal activated brake to the brake lights such that the brake lights are illuminated with power from the power source upon the brake activated brake being activated. A second circuit connects the power source and the engine brake to the brake lights such that the brake lights are illuminated with power from the power source upon operation of the engine brake. This system is intended to prevent accidents occurring in which motor vehicles drive into the rear end of trucks that have slowed down using their engine brake.

1 Claim, 1 Drawing Sheet

BRAKE LIGHT CONFIGURATION FOR A TRUCK HAVING AN ENGINE BRAKE

The present invention relates to a brake light configuration for a truck having an engine brake.

BACKGROUND OF THE INVENTION

In most jurisdictions across North America laws have been enacted making it mandatory for a motor vehicle to be equipped with rear brake lights connected to a pedal activated brake. The brake lights are illuminated upon activation of the pedal activated brake. When one motor vehicle is following another, the illumination of the lights of the lead vehicle provides a driver of the following motor vehicle with warning that the lead vehicle is about to stop.

Most large trucks have an auxiliary braking system known as an "engine brake". The engine brake uses the engine to slow the vehicle down. The driver does not need to activate the pedal activated brake in order to activate the engine brake. As a consequence, the brake lights are not illuminated.

Every year accidents occur in which motor vehicles drive into the rear end of trucks that have slowed down using their engine brake.

SUMMARY OF THE INVENTION

What is required is a modified brake light configuration for a truck having an engine brake.

According to the present invention there is provided a brake light configuration for a truck having an engine brake including the engine brake, a pedal activated brake, a power source and brake lights. A first circuit connects the pedal activated brake to the power source and the brake lights such that the brake lights are illuminated with power from the power source upon the brake activated brake being activated. A second circuit connects the power source and the engine brake to the brake lights such that the brake lights are illuminated with power from the power source upon operation of the engine brake.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
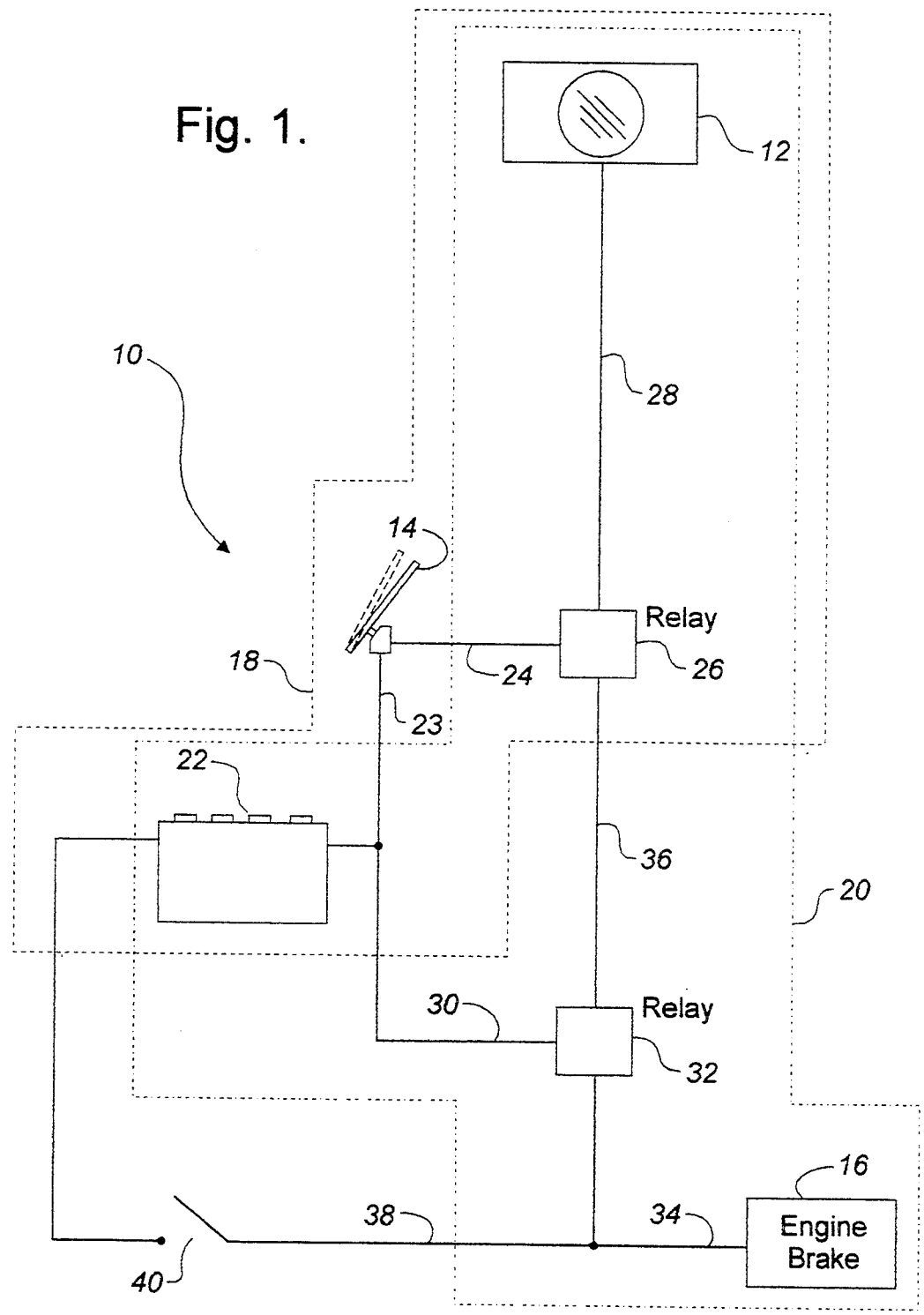
FIG. 1 is a schematic diagram which illustrates a preferred brake light configuration for a truck having an engine brake.

The preferred embodiment, a brake light configuration for a truck having an engine brake generally identified by reference numeral 10, will now be described with reference to FIG. 1.

Brake light configuration 10 has brake lights 12 that are activated upon a brake pedal 14 connected to a pedal activated braking system (not shown) being depressed or upon operation of an engine brake 16, as will hereinafter be further described. Brake lights 12 are connected in by a first circuit 18 to brake pedal 14 and by a second circuit 20 to engine brake 16. First circuit 18 and second circuit 20 both are powered from common power source, battery 22. First circuit 18 includes a line 23 from battery 22 to brake pedal 14, a line 24 from brake pedal 14 to relay switch 26, and a line 28 from relay switch 26 to brake lights 12. Upon brake pedal 14 being depressed power from battery 22 passes along lines 23 and 24 to relay switch 26 and through relay switch 26 along line 28 to activate brake lights 12. Second circuit 20 includes a line 30 from battery 22 to relay switch 32, a line 34 from relay switch 32 to engine brake 16, a line 36 from relay switch 32 to relay switch 26 and line 28 from relay switch 26 to brake lights 12. In addition, second circuit 20 includes a line 38 is provided that contains an on/off switch 40 for engine brake 16. Engine brake 16 cannot operate unless switch 40 has been placed in an on position to complete second circuit 20. Upon activation of engine brake 16, power from battery 22 passes through line 30 to relay switch 32, along line 36 from relay switch 32 to relay switch 26 and along line 28 to activate brake lights 12.

The use and operation of brake light configuration 10 will now be described with reference to FIG. 1. Brake light configuration 10 is intended to prevent accidents occurring in which motor vehicles drive into the rear end of trucks that have slowed down using their engine brake. As previously described, brake lights 12 are illuminated upon activation of either pedal activated brake 14 being depressed or operation of engine brake 16. It is irrelevant to the driver of the following vehicle which mode of braking is being used, he need only know that the lead truck is slowing down. Upon activation of pedal activated brake 14, first circuit 18 is completed to supply power from battery 22 to brake lights 12. Similarly, upon activation of engine brake 16, second circuit 20 is completed to supply power from battery 22 to brake lights 12.

It will be apparent to one skilled in the art that modifications may be made to the illustrated embodiment without departing from the spirit and scope of the invention as defined by the Claims.

The embodiments of the invention in which an exclusive property or privilege is claimed are as follows:

1. A brake light configuration for a truck having an engine brake, comprising:
    a. the engine brake;
    b. a pedal activated brake;
    c. brake lights;
    d. a power source;
    e. a first circuit connecting the power source and the pedal activated brake to the brake lights such that the brake lights are illuminated with power from the power source upon the pedal activated brake being activated;
    f. a second circuit connecting the power source and the engine brake to the brake lights such that the brake lights are illuminated with power from the power source upon operation of the engine brake;
    g. a first relay switch connecting both the first circuit and the second circuit to the brake lights, such that the brake lights can be activated by the pedal activated brake or by the engine brake; and
    h. a second relay switch connecting the engine brake with the first relay switch, such that the engine brake is isolated by the second relay switch from activation when the first circuit is closed by the pedal activated brake.

* * * * *